J. J. MOJONNIER.
VACUUM PAN CONDENSER.
APPLICATION FILED MAY 2, 1919.
1,431,322. Patented Oct. 10, 1922.
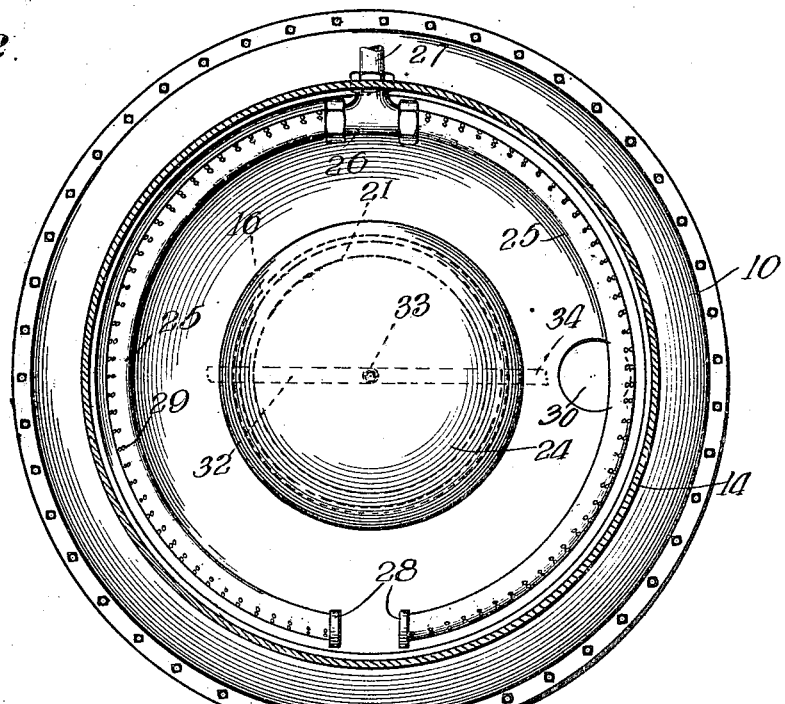
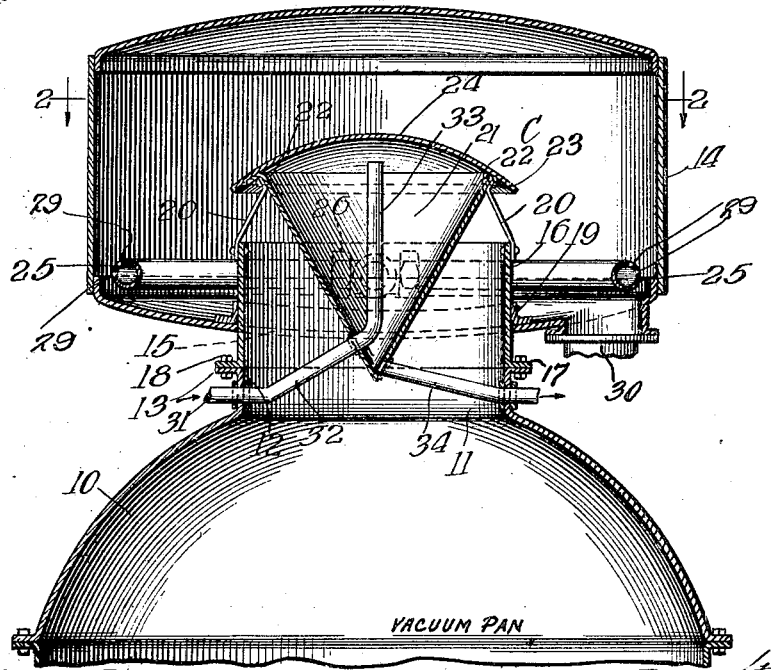

Patented Oct. 10, 1922.

1,431,322

UNITED STATES PATENT OFFICE.

JULIUS JOHN MOJONNIER, OF OAK PARK, ILLINOIS, ASSIGNOR, BY MESNE ASSIGNMENTS, TO MOJONNIER BROS. CO., OF CHICAGO, ILLINOIS, A CORPORATION OF ILLINOIS.

VACUUM-PAN CONDENSER.

Application filed May 2, 1919. Serial No. 294,190.

*To all whom it may concern:*

Be it known that I, JULIUS JOHN MOJONNIER, a citizen of the United States, and a resident of Oak Park, in the county of Cook and State of Illinois, have invented certain new and useful Improvements in Vacuum-Pan Condensers, of which the following is a specification.

This invention relates to condensers, particularly for use in connection with vacuum pans used in the manufacture of condensed milk and has for its object a more efficient and effective device of this character wherein a rapid and complete condensation of the vapors will be accomplished.

With the above and other objects in view, this invention consists in the construction, combination and arrangement of parts all as hereinafter more fully described, claimed and illustrated in the accompanying drawings, wherein—

Fig. 1 is a central vertical section through the condenser constituting the subject matter of the present invention, illustrating the same in conjunction with a fragmentary portion of a vacuum pan; and Fig. 2 is a horizontal section taken along line 2—2 of Fig. 1.

Reference being had more particularly to the drawings, 10 indicates a standard vacuum pan used in the manufacture of condensed milk, wherein the water within the fresh milk is evaporated. At the top of the vacuum pan is a concentrically disposed opening 11 surrounded by the lip 12 which terminates in the horizontal flange 13. The steam and other vapors generated within the vacuum pan 10 by the evaporation process are exhausted through this opening 11 after which they are received by the condenser C forming the subject matter of the present invention. This condenser comprises the relatively shallow cylindrical casing 14 provided with a concentric opening 15 in the bottom thereof, through which extends the tubular throat 16 of the pan 10 completely occupying the opening 15 and projecting beyond each side of the bottom of the casing 14. At its lower end this throat 16 terminates in a horizontal flange 17 which rests flush upon the horizontal flange 13 of the lip 12 of the vacuum pan 10. The two flanges 13 and 17 are held in a fixed position by means of the bolts 18 which pierce both of the flanges 17 and 13, and rigidly secure the throat 16 and the casing 14 to the vacuum pan. An angle iron 19 is provided which encircles the throat 16 and co-operates with the bottom of the casing 14 to rigidly and permanently secure said throat 16 to the bottom of the casing.

The end of the throat 16 within the casing 14 has the supporting bracket arms 20 secured thereto, said arms converging toward the center line of the casing 14. An inverted hollow cone 21 acts as a baffle and is secured to the outer terminals of those bracket arms 20 by means of the rivets or other suitable securing means 22, the base edge of said cone being bent over the terminals of the bracket rods 20, thereby creating the flange 23. This inverted cone 21 hangs from the bracket arms 20 and extends into the tubular throat 16, the axis of said cone corresponding approximately with the central line of the casing 14. Mounted on the flange 23 and rigidly secured thereto is a plate 24 which constitutes a segment of a hollow sphere and overhangs the throat 16 for directing condensation and the like into the space between the throat 16 and the outer vertical wall of the casing 14.

On the interior of the casing 14, and located adjacent to the vertical wall and the bottom of said casing, are the semicircular water distribution pipes 25 communicating by means of the T-fitting 26 with the water supply pipe 27 which pierces the wall of the casing 14, the free ends of said distribution pipes being capped as at 28. The upper surfaces of these pipes 25 are pierced by a plurality of rows of apertures 29, all of said apertures being so positioned in the pipes that the sprays of water therefrom will be directed toward the wall of the casing 14 rather than in a direct vertical sheet.

The bottom of the casing 14 has upon one side thereof a water exhaust 30 by means of which the cooling water discharged by the pipes 25 is withdrawn from the condenser C, together with all of the condensed vapors and steam, accumulated by the operation of the condenser. This water exhaust may operate merely by gravity, or it may be connected with a vacuum suction, as desired. In operation the vapors and steam created within the vacuum pan 10 during the manufacture of condensed milk pass through the opening 11 and enter the throat 16, by which they are conducted to the interior of the casing 14. As these vapors and steam pass through the throat 16, they contact with the inverted cone 21 and are directed thereby toward the wall of the casing 14 through the space between the plate 24 and the inner terminal of the throat 16, said plate 24 and the base edge of the cone 21 being elevated, as before described, above the inner terminal of the tubular throat 16. The water admitted by the pipe 27 into the distribution pipes 25 is sprayed upwardly through the series of apertures 29 from the bottom of the casing 14 to the top thereof, after which these sprays of water return by gravity to the bottom of the casing. The oblique arrangement of the series of apertures 29 directs the water toward the wall of the casing 14 and prevents it from spraying or splashing back into the vacuum pan 10. In this manner the vapors and steam entering the condenser C are subjected to what may be called a double action of sprays of cold water, i. e., they are first subjected to the spray of cold water as it ascends to the top of the casing, and they are next subjected to the same water as it returns to the bottom of the casing. This condenses the vapors and steam so that they may be withdrawn from the condenser through the opening 30 provided therefor.

It is manifest from the foregoing that the temperature within the condenser C, and also the temperature of the parts making up said condenser, are relatively cold when compared to the vacuum pan and the vapors and steam emitted therefrom. Hence, it is possible that the inverted cone 21 together with the plate 24, which in combination constitute a casing, may be of such a temperature as to cause a condensation of the vapors and steam contacting therewith in passing into the condenser C. If such a condensation should occur on the cone 21 and the plate 24, there would be a constant dripping from such cone into the vacuum pan 10. To obviate this difficulty the cone 21 and the plate 24 are heated by means of the pipe 31 piercing the lip 12 of the vacuum pan 10 and bent obliquely as at 32 to enter the cone 21 adjacent to the apex thereof. This pipe 31 is then bent to assume a vertical position as at 33 after which it terminates adjacent to the plate 24. In this manner steam is conducted to the interior of the cone 21 where it is released and maintains the plate 24 and the cone 21 at a desirable temperature. To exhaust this steam which has been released within the cone 24, an exhaust pipe 34 is connected to the cone 21 at the apex thereof and extends through the lip 12 of the vacuum pan 10 at a point diametrically opposed to the pipe 31.

While the preferred form of the present invention has been illustrated and described, it is apparent that many changes as to the details of construction may be accomplished without departing from the spirit and scope hereof.

What is claimed is:

1. In a condenser, the combination with a casing, of means for distributing a fluid throughout a wide expanse within said casing, means for directing the fluid to be condensed toward the fluid so distributed and means for heating the last mentioned means.

2. In a condenser, the combination with a casing, of means for distributing a fluid from the bottom of said casing toward the top thereof and in the direction of the casing wall, means for directing the fluid to be condensed toward the fluid so distributed and means for heating the last mentioned means.

3. In a condenser, the combination with a casing, provided with an inlet, of a throat extending through said inlet, a series of convergent bracket arms carried at the inner end of said throat, a hollow inverted cone secured to said bracket arms and hanging in said throat, a curved plate fixed to the base edge of said cone, a steam supply pipe extending into said cone and terminating adjacent to said plate, and an exhaust pipe communicating with said cone at the apex thereof.

4. In a condenser, the combination with a casing, of a throat piercing said casing, a series of bracket arms secured to said throat, a hollow inverted cone carried by said arms and hanging in said throat, a curved plate secured to the base edge of said cone, a steam supply pipe terminating within the cone aforesaid, and an exhaust pipe co-operating therewith.

5. In a condenser, the combination with a casing, of a throat piercing said casing, a closed hollow inverted cone supported by and extending into said throat, means for supplying steam into the interior of said cone, and means for exhausting said steam and any condensation thereof.

6. In a condenser, the combination with a casing, of a throat piercing said casing, a closed hollow cone supported by and extending into said throat, and means for supplying steam to and exhausting it from the cone aforesaid.

7. In a condenser, the combination with a throat, of a casing carried thereby, into which the throat projects, an inverted cone supported at the upper end of the throat and projecting into said throat, and a water distribution pipe at the bottom of said casing.

8. In a condenser, the combination with a casing, of a throat supporting said casing and projecting into the same, an inverted cone supported at the upper end of said throat and projecting into said throat, and a circular water distribution pipe surrounding said throat and located adjoining the wall of said casing adapted to direct a vertical and outward spray.

JULIUS JOHN MOJONNIER.